(12) United States Patent
Vargantwar

(10) Patent No.: US 8,514,735 B1
(45) Date of Patent: Aug. 20, 2013

(54) METHODS AND SYSTEMS FOR MANAGING A CONNECTION-SETUP PROCESS

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 370 days.

(21) Appl. No.: 12/948,956

(22) Filed: Nov. 18, 2010

(51) Int. Cl.
*H04J 3/14* (2006.01)
(52) U.S. Cl.
USPC .......................................... 370/252; 455/442
(58) Field of Classification Search
None
See application file for complete search history.

(56) References Cited

U.S. PATENT DOCUMENTS 6,424,835 B1 * 7/2002 Shin .............................. 455/445
7,787,899 B1 * 8/2010 Talley et al. ................... 455/522

OTHER PUBLICATIONS

Unpublished U.S. Appl. No. 12/192,217, entitled "Method and System for Reducing Communication Session Establishment Latency," filed Aug. 15, 2008 in the name of Maulik Shah et al.
Unpublished U.S. Appl. No. 12/834,045, entitled "Dynamic Reverse Activity Bit Offset Adjustment Based on Soft Handoff Ratio," filed Jul. 12, 2010 in the name of Sachin Vargantwar.

* cited by examiner

*Primary Examiner* — Andrew Lai
*Assistant Examiner* — Leon Andrews

(57) ABSTRACT

In at least one embodiment, a radio access network (RAN) transmits a connection-setup message to an access terminal. If the RAN has not, within a predetermined amount of time after transmitting the connection-setup message, received a response to the connection-setup message from the access terminal, the RAN makes a poor-link-quality determination as to whether the quality of the reverse link was below a threshold level for an evaluation period consisting of at least part of the time that has elapsed since transmitting the connection-setup message. If not, the RAN treats the non-receipt of the response as a failure of the connection-setup process at least in part by terminating the process. But if so, the RAN excuses non-receipt of the response at least in part by continuing the process.

20 Claims, 6 Drawing Sheets

METHODS AND SYSTEMS FOR MANAGING A CONNECTION-SETUP PROCESS

BACKGROUND

To engage in a wireless connection, an access terminal typically engages in a connection-setup process with a radio access network (RAN). As part of this process, the access terminal may send a connection request to a serving RAN via a reverse link, which triggers additional connection-setup messaging between the access terminal and the RAN. As the connection-setup process proceeds, however, the RAN may send a connection-setup message (e.g., a reverse-traffic-acknowledgement message) to the access terminal via a forward link and, for some reason, not receive an expected response to the connection-setup message (e.g., a traffic-channel-complete message) from the access terminal.

OVERVIEW

Methods and systems are disclosed for managing a connection-setup process between a RAN and an access terminal. A RAN may transmit a connection-setup message to an access terminal. If the RAN has, within a predetermined amount of time after transmitting the connection-setup message, received a response to the connection-setup message from the access terminal via the reverse link, the RAN may continue the connection-setup process. Alternatively, if the RAN has not, within the predetermined amount of time after transmitting the connection-setup message, received a response to the connection-setup message from the access terminal via the reverse link, the RAN may make a poor-link-quality determination as to whether a quality of the reverse link was below a threshold level for an evaluation period consisting of at least part of the time that has elapsed since transmitting the connection-setup message. If the poor-link-quality determination is in the negative, the RAN may treat the non-receipt of the response as a failure of the connection-setup process. However, if the poor-link-quality determination is in the affirmative, the RAN may excuse the non-receipt of the response, at least in part by continuing the connection-setup process.

BRIEF DESCRIPTION OF THE DRAWINGS

Various embodiments are described herein with reference to the following drawings, wherein like numerals denote like entities.

DETAILED DESCRIPTION

Figure 1:
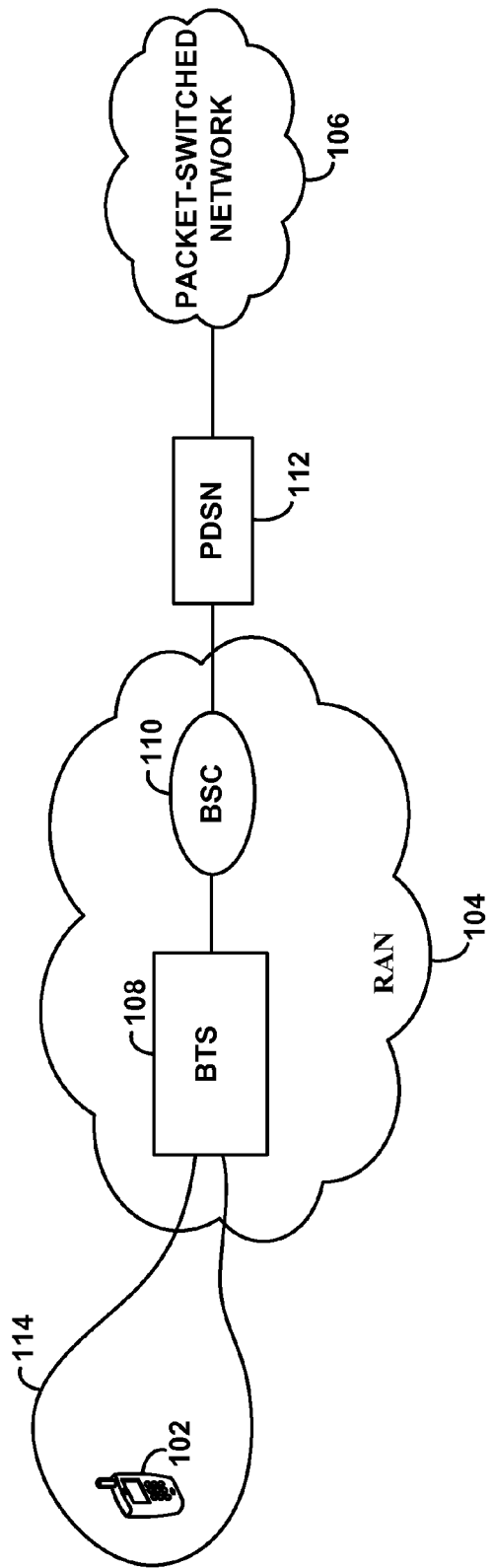
FIG. 1 is a simplified block diagram of a communication system in which at least one embodiment can be employed.

1. Overview of an Example Method and System

Disclosed herein are methods and systems for managing the connection-setup process between a RAN and an access terminal. As mentioned above, during a connection-setup process, the RAN typically transmits a connection-setup message to the access terminal via the forward link. To continue or complete the connection-setup process, the RAN typically awaits to receive from the access terminal via the reverse link a response to the connection-setup message. For example, during the connection-setup process, the RAN may transmit a reverse-traffic-acknowledgement message to the access terminal via the forward link. To complete the connection-setup process, the RAN may await receipt of a traffic-channel-complete (TCC) message from the access terminal via the reverse link. After receiving the TCC message, the RAN may then complete the connection-setup process, and the RAN and access terminal may thereafter exchange call data. However, if the TCC message is not received after a given amount of time, the RAN would typically terminate the connection-setup process.

In some situations, the failure to receive a response, such as a TCC message, to the connection-setup message may result from a temporary problem on the reverse link. For example, the reverse link may temporarily experience a high level of reverse noise rise (RNR). In such a case, it may be beneficial to not let that temporary problem on the reverse link prevent the continuation or completion of the connection-setup process. Thus, in accordance with the at least one embodiment, the RAN may not terminate—and instead continue—a connection-setup process due to a temporary problem on the reverse link.

Thus, in accordance with at least one embodiment, the RAN may transmit a connection-setup message to an access terminal via the forward link. If the RAN has, within a predetermined amount of time after transmitting the connection-setup message, received from the access terminal via the reverse link a response to the connection-setup message, the RAN may continue the connection-setup process. Alternatively, if the RAN has not, within the predetermined amount of time after transmitting the connection-setup message, received a response to the connection-setup message, the RAN may make a poor-link-quality determination as to whether the quality of the reverse link was below a threshold level for an evaluation period consisting of at least part of the time that has elapsed since transmitting the connection-setup message. If the poor-link-quality determination is in the negative, the RAN may treat the non-receipt of the response as a failure of the connection-setup process, at least in part by terminating the connection-setup process. If the poor-link-quality determination is in the affirmative, however, the RAN may excuse the non-receipt of the response, at least in part by continuing the connection-setup process.

Beneficially, then a RAN may continue the connection-setup process despite a temporary problem on the reverse link. This may result in a more-efficient connection setup (i.e., one having a shorter duration) than a typical situation where a RAN terminates a connection-setup process due to non-receipt of a response, in which case an access terminal would need to re-initiate the connection-setup process with the RAN (or with a different RAN).

2. Example Communication System Architecture

FIG. 1 is a simplified block diagram of a communication system in which at least one embodiment can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium, where such a "machine-readable medium" is not merely a transitory signal, but rather is a non-transitory storage medium.

System 100 includes an access terminal, such as access terminal 102, which can be linked by a RAN 104 with a packet-switched network 106, such as an IP network. Access terminal 102 can take various forms, examples of which include a mobile phone, a personal digital assistant, a wirelessly-equipped personal computer, or another wirelessly-equipped device of any sort (whether technically "mobile" or fixed/stationary). RAN 104 generally functions to serve wireless access terminals such as access terminal 102 and other access terminals, so as to provide those devices with resources such as the ability to communicate with other entities (or with each other) via the RAN. As such, RAN 104 may take various forms, the details of which are not critical and may depend on the air-interface protocol of RAN 104 and/or on other factors.

A simple RAN, for instance, could take the form of a (combined or separate) wireless access point and router (e.g., a (combined or separate) Wi-Fi access point and router) coupled with a local area network. Alternatively, the RAN can be more complex, such as a cellular wireless network including one or more base stations, controllers, switches, gateways, and/or other components now known or later developed. Further, RAN 104 may operate according to CDMA, EV-DO, iDEN, TDMA, AMPS, GSM, GPRS, UMTS, EDGE, WiMAX (e.g., IEEE 802.16), LTE, satellite, Wi-Fi (e.g., IEEE 802.11), and/or any other wireless technology or technologies now known or later developed. In accordance with at least one embodiment, RAN 104 operates according to EV-DO.

In one embodiment, as shown, RAN 104 may be a cellular RAN that includes at least one base transceiver station (BTS) 108 coupled with a base station controller (BSC) 110, which may in turn be coupled with a packet-data serving node (PDSN) 112 or other gateway to packet-switched network 110, so as to enable access terminal 102 to communicate via RAN 104 with entities on the packet-switched network 106. As depicted, BTS 108 operates to define a wireless coverage area 114. An air interface of this wireless coverage area may include a forward link for transmitting information from BTS 108 to access terminal 102 and a reverse link for transmitting information from access terminal 102 to BTS 108. Via the forward and reverse links, BTS 108 and access terminal 102 exchange signaling traffic, as well as bearer traffic such as voice, data, video, and/or other media.

3. Example RAN Components

Figure 2:
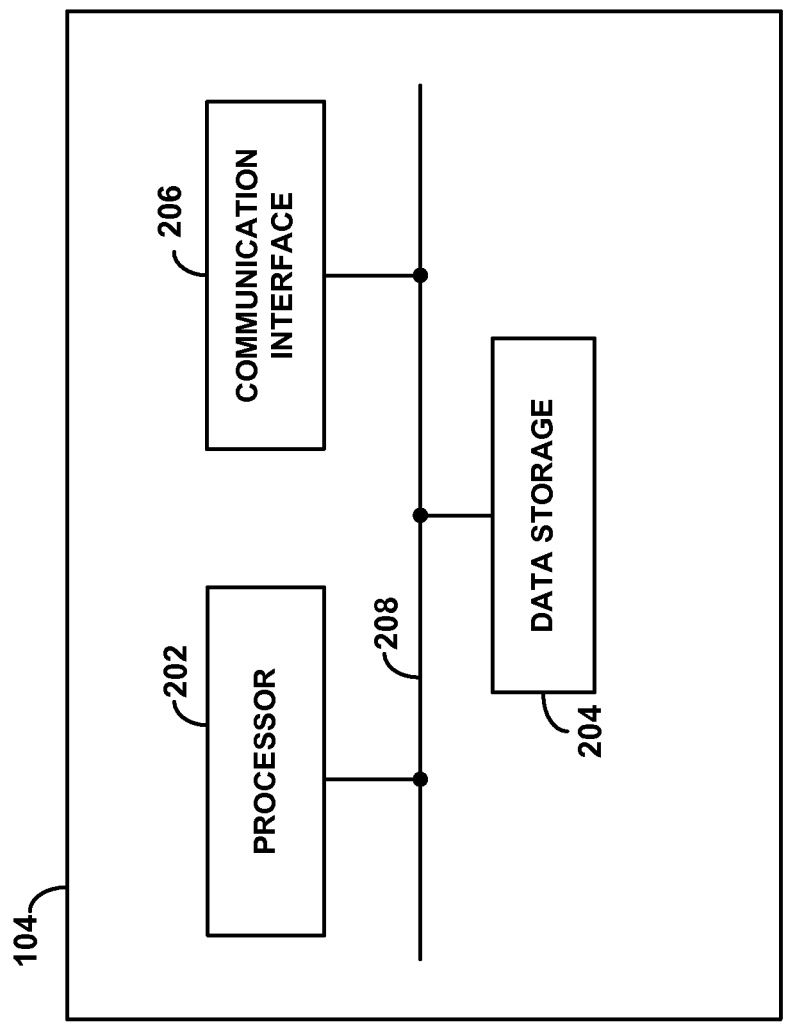
FIG. 2 is a simplified block diagram of a radio access network (RAN) that can be used in the arrangement of FIG. 1.

A block diagram of at least part of an example RAN 104 is provided in FIG. 2, in order to illustrate some of the components that could be included in the RAN to carry out embodiments. As shown in FIG. 2, the RAN 104 may include a processor 202, data storage 204, and communication interface 206, all of which may be coupled together by a system bus or other mechanism 208.

Each of these components of RAN 104 may take various forms. For instance, processor 202 could be one or more general-purpose microprocessors and/or dedicated signal processors. Data storage 204 could be volatile and/or non-volatile memory, such as flash memory. RAN 104 may externally communicate with external entities such as access terminal 102 via communication interface 206. Data storage 204 holds a set of logic (e.g., computer instructions) executable by processor 202 to carry out the various RAN functions described herein and perhaps other functions. Data storage 204 may also have stored therein one or more reverse-link-quality histories and one or more thresholds of reverse-link quality and available RAN resources. In some embodiments, one or more of the RAN functions can be carried out by firmware and/or hardware.

4. Example Operation

Figure 3:
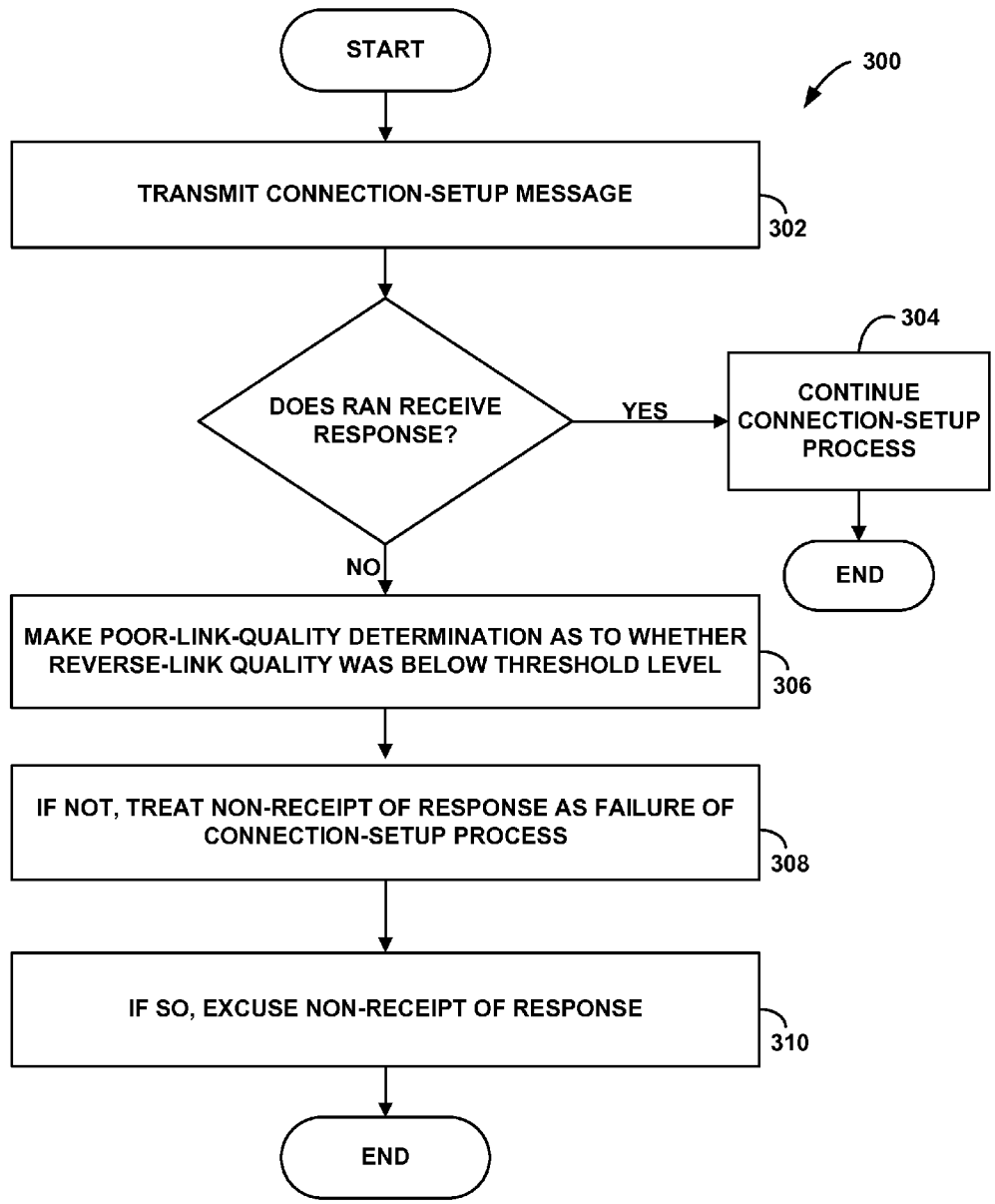
FIG. 3 is a flow chart of a method that can be carried out in accordance with an embodiment.

Referring next to FIG. 3, a flow chart is provided to help illustrate some of the functions that can be carried out by a RAN in a wireless communication system, such as RAN 104 depicted in FIGS. 1 and 2. In particular, FIG. 3 is a flow chart illustrating a method of managing a connection-setup process between a RAN and an access terminal. By carrying out the functions illustrated in FIG. 3, the RAN may determine whether to continue a connection-setup process despite non-receipt of a response to a connection-setup message within a predetermined amount of time after sending the connection-setup message. The example of FIG. 3 shows steps performed by RAN 104. A goal of method 300 is to avoid abandoning a connection-setup process due to a temporary problem on the reverse link.

As shown in FIG. 3, method 300 begins at step 302, where RAN 104 transmits a connection-setup message to access terminal 102 via the forward link. RAN 104 may then either receive or not receive, within a predetermined amount of time after transmitting the connection-setup message, a response to the connection-setup message. If RAN 104 has, within the predetermined amount of time after transmitting the connection-setup message, received a response to the connection-setup message, RAN 104 at step 304 continues the connection-setup process.

However, if RAN 104 has not, within the predetermined amount of time after transmitting the connection-setup message, received a response to the connection-setup message, RAN 104 at step 306 makes a poor-link-quality determination as to whether the quality of the reverse link was below a threshold level for an evaluation period consisting of at least part of the time that has elapsed since transmitting the connection-setup message.

Next, if the poor-link-quality determination is in the negative (i.e., the quality of the reverse link was not below the threshold level for the evaluation period), RAN 104 at step 308 treats non-receipt of the response message as failure of the connection-setup process, at least in part by terminating the connection-setup process. On the other hand, if the poor-link-quality determination is in the affirmative (i.e., the quality of the reverse link was below the threshold level for the evaluation period), RAN 104 at step 310 excuses non-receipt of the response message, at least in part by continuing the connection-setup process.

Figure 4:
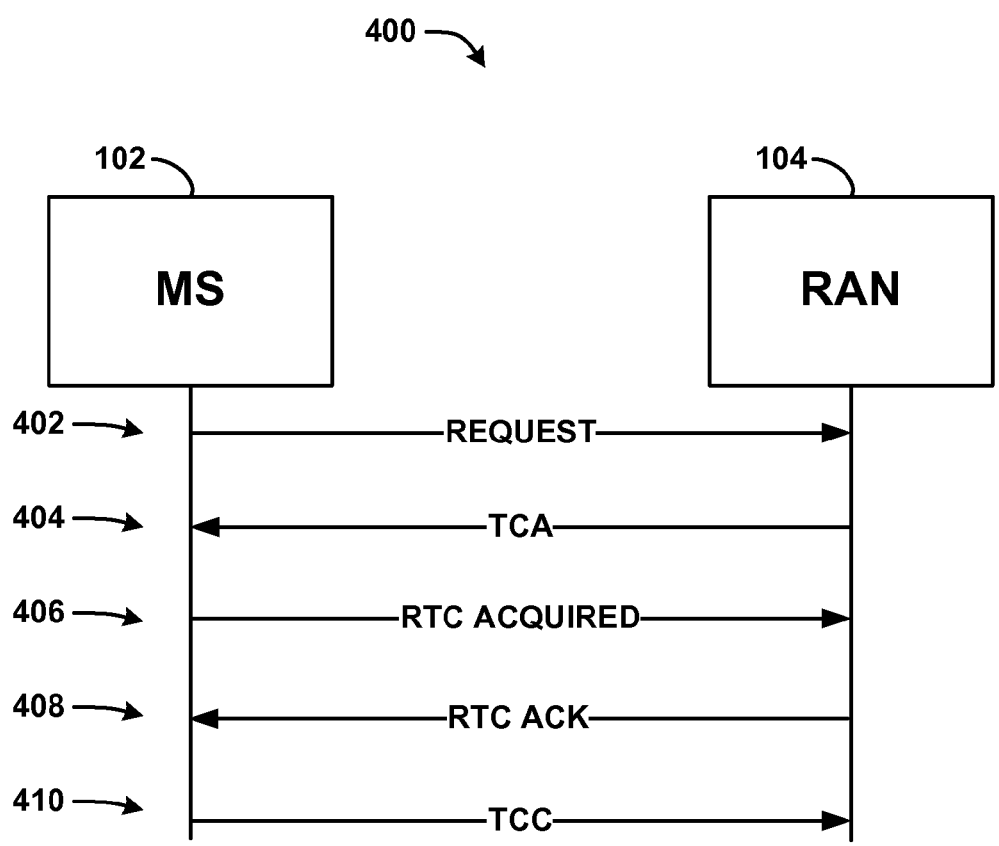
FIG. 4 depicts a possible connection-setup process to which the method illustrated in FIG. 3 may apply.

As mentioned above, method 300 begins at step 302, where RAN 104 transmits a connection-setup message to access terminal 102 via a forward link. The connection-setup message may be any message RAN 104 sends to access terminal 102 to facilitate connecting with access terminal 102. A typical connection-setup process involving the exchange of connection-setup messages to which method 300 may apply is illustrated in FIG. 4. It should be understood, however, that other connection-setup processes may involve the exchange of different and/or additional connection-setup messages.

In particular, FIG. 4 illustrates a possible connection-setup process 400 that may occur between RAN 104 and access terminal 102. At step 402, access terminal 102 transmits a request message to RAN 104. In an embodiment, access terminal 102 may transmit the request message over an access channel. This request message may notify RAN 104 that the access terminal is requesting a traffic-channel assignment. At step 404, RAN 104 responds to access terminal 102 by transmitting a traffic-channel-assignment (TCA) message. At step 406, access terminal 102 responds to the TCA message with a reverse-traffic-channel-(RTC)-acquired message. In an embodiment, the access terminal may transmit this RTC-acquired message over the assigned traffic channel. In response to receiving the RTC-acquired message, RAN 104 transmits, at step 408, an RTC-acknowledgement-(ACK) message to access terminal 102. Finally, in response to receiving the RTC-ACK message, access terminal 102 then would transmit a traffic-channel-complete (TCC) message to RAN 104 at step 410.

Returning to FIG. 3, in an embodiment, the connection-setup message transmitted at step 302 via the forward link by RAN 104 is the RTC-ACK message. However, method 300 could equally apply to other connection-setup messages, such as the TCA message. At step 304, if RAN 104 has, within a predetermined amount of time after transmitting the connection-setup message, received a response to the connection-setup message, RAN 104 continues the connection-setup process. As mentioned above, when the connection-setup process is the RTC-ACK message, the response to the connection-setup message is typically the TCC message. Thus, if RAN 104 has, within a predetermined amount of time after transmitting the RTC-ACK message, received the TCC message, RAN 104 continues the connection-setup process.

Typically the connection-setup process is complete upon receipt of the TCC message. Thus, in such an example, continuing the connection-setup process may involve RAN 104 treating the connection-setup process as successfully concluded. After the connection-setup process is successfully concluded, RAN 104 may then exchange additional data, such as call data, with the access terminal. However, in other examples (e.g., when the connection-setup message is the TCA message), RAN 104 and access terminal 102 may need to exchange additional connection-setup information before the connection-setup process is complete. Thus, continuing the connection-setup process may include exchanging additional connection-setup messages.

If RAN 104 has not, within the predetermined amount of time after transmitting the connection-setup message, received a response to the connection-setup message, RAN 104 at step 304 makes a poor-link-quality determination as to whether a quality of the reverse link was below a threshold level for the evaluation period.

RAN 104 may make the poor-link-quality determination in a variety of ways. In an embodiment, RAN 104 monitors the quality of the reverse link to determine a reverse-link-quality history and then compares the reverse-link-quality history to the threshold level to determine whether the quality of the reverse link was below the threshold level for the evaluation period.

In an example, RAN 104 may determine whether the quality of the reverse link was below the threshold level at any time during the evaluation period, which may be the entire time that has elapsed since transmitting the connection-setup message.

However, in another example, RAN 104 may determine whether the quality of the reverse link was below the threshold level for at least a threshold amount of time (e.g., 1 second, 1.5 seconds, 2 seconds, etc.) since transmitting the connection-setup message; as such this threshold amount of time could be all or part of the total time that has elapsed since transmitting the connection-setup message. And certainly other examples are possible.

Figure 5A:
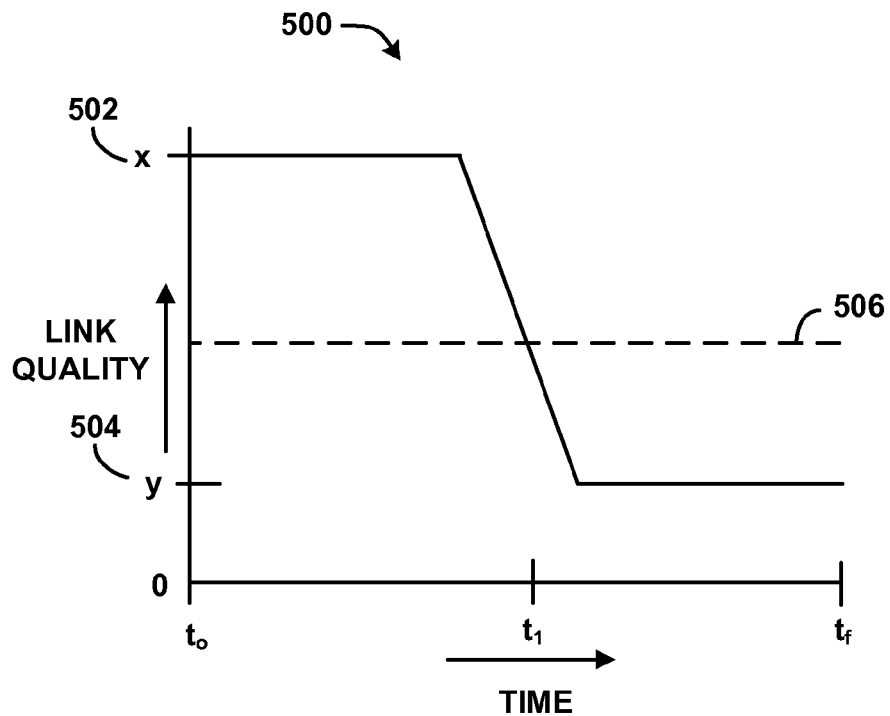
FIG. 5a depicts a reverse-link-quality history in accordance with an embodiment.

FIG. 5a depicts an example reverse-link-quality history where the reverse-link quality was below the threshold level for at least part of the time that elapsed since the network transmitted the connection-setup message. As seen in FIG. 5a, reverse-link quality 500 changes over time from a high quality to a lower quality. In particular, the reverse-link quality at time $t_0$ is at level "x" 502. In this example, time $t_0$ corresponds to the time that the connection-setup message is sent from RAN 104 to access terminal 102. Over time, however, the reverse-link quality 500 decreases below reverse-link-quality threshold level 506. In particular, at time $t_f$, the reverse-link quality 500 is at level "y" 504. In this example, time $t_f$ corresponds to the predetermined amount of time after transmitting the connection setup. Reverse-link quality 500 fell below threshold level 506 at time $t_1$ and remained below the threshold level 506 until time $t_f$. Thus, from time $t_1$ until time $t_f$, RAN 104 suffers from a reverse-link quality below the threshold level 506.

This poor reverse-link quality may be the reason that RAN 104 did not receive a response to the connection-setup message. In particular, poor reverse-link quality may prevent RAN 104 from receiving the response sent from access terminal 102 via the reverse link. For instance, if the time access terminal 102 sends the response to RAN 104 corresponds with a time of low reverse-link quality (such as any time between $t_1$ and $t_f$), RAN 104 may be unable to decode the response, and thus RAN 104 would have registered receiving the response.

FIG. 5a is intended as an example only. It should be understood that other example reverse-link-quality histories are possible as well. For example, the reverse-link quality could be below (or above) the threshold for the entire time period between $t_0$ and $t_f$. In another example, the reverse-link-quality history may oscillate above and below the threshold one or more times during the time period between $t_0$ and $t_f$.

RAN 104 may monitor the quality of the reverse link to determine a reverse-link-quality history in a variety of ways. In an embodiment, monitoring the quality of the reverse link comprises monitoring a reverse-noise-rise (RNR) level of the reverse link. As known in the art, a RAN may continually measure an aggregate of reverse-link transmission power and every 1.67 ms (i.e., every time slot) compute the RNR, which is the difference between (i) the reverse noise that the RAN is currently detecting and (ii) a baseline level of reverse noise. Thus, the RAN may compute how far the reverse noise has risen above that baseline. A high RNR typically indicates less favorable RF conditions than a low RNR. Thus, high RNR may correspond to a low reverse-link quality. Similarly, a lower RNR may correspond to a higher reverse-link quality.

Figure 5B:
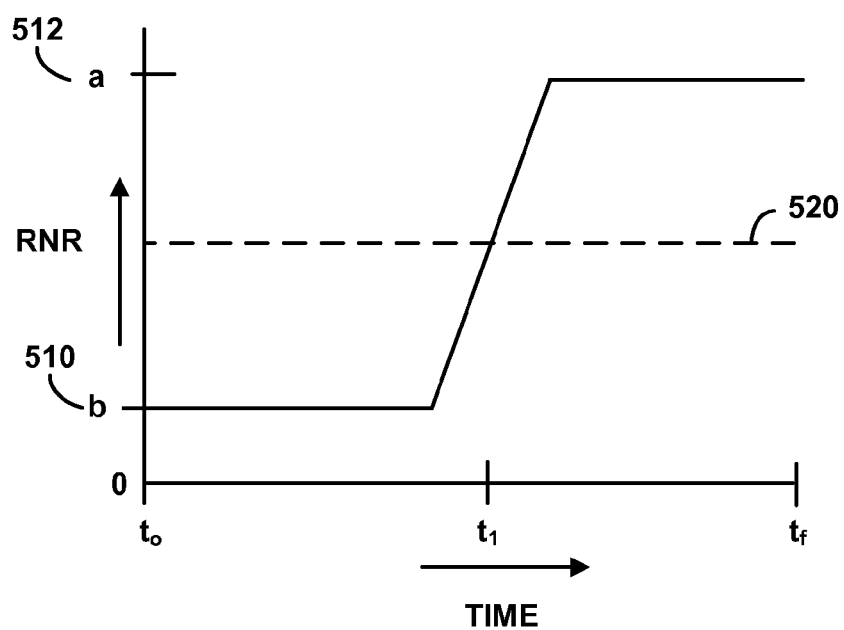
FIG. 5b depicts a reverse-noise-rise (RNR) history in accordance with an embodiment.

FIG. 5b depicts the reverse-link quality 500 of FIG. 5a in terms of RNR over time. As shown, the RNR at time $t_0$ is at level "b" 510, and this RNR level corresponds to the reverse-link-quality level "x" 502. Further, the RNR at time $t_f$ is at level "a" 512, and this RNR level corresponds to the reverse-link-quality level "y" 504. Still further, the threshold RNR level 520 corresponds to threshold level 506. In an embodiment, the RNR threshold may be 7 decibels or higher. Generally, such an RNR level may result in RAN 104 not receiving messages communicated to RAN 104 from access terminal 102. However, in other examples, the RNR threshold may be lower than 7 decibels.

Instead of or in addition to monitoring an RNR level of the reverse link, RAN 104 may monitor the quality of the reverse link to determine a reverse-link-quality history in other ways. For example, monitoring the quality of the reverse link may involve monitoring the actual received power levels.

As mentioned above, RAN 104 may make the poor-link-quality determination if the RAN does not receive the response within a predetermined amount of time after transmitting the connection-setup message. The predetermined amount of time may be set by design choice. As mentioned above, a RAN typically terminates a connection-setup process if the RAN does not receive a response within a given amount of time. For instance, a RAN may typically wait 5-7 seconds for a response before opting to terminate the connection-setup process. Thus, in an embodiment, the predetermined amount of time after transmitting the connection-setup message is at least five seconds. However, in other examples, the predetermined amount of time may be less than or greater than five seconds.

Further, in some situations, a RAN may attempt to retransmit the connection-setup message prior to terminating the connection-setup process. In such a situation, the predetermined amount of time after transmitting the connection-setup message may be the time after the transmittal of the original connection-setup message. For example, if the RAN is configured to retransmit the connection-setup message after three seconds of non-receipt of a response message, the predetermined amount of time after transmitting the connection-setup message may be 5-7 seconds after the transmittal of the original connection-setup message. However, in another example, the method 300 may apply to the retransmitted connection-setup message, and as such the predetermined amount of time may be a predetermined amount of time after transmittal of the retransmitted connection-setup message. For example, if the RAN is configured to retransmit the connection-setup message after three seconds of non-receipt of a response message, the predetermined amount of time may be 5-7 seconds after the transmittal of the retransmitted connection-setup message. And certainly many other examples are possible as well.

Returning to FIG. 3, if the poor-link-quality determination is in the negative, RAN 104 at step 306 treats non-receipt of the response as a failure of the connection-setup process. Treating the non-receipt of the response as a failure may involve terminating the connection-setup process. In this case, temporary poor reverse-link quality was likely not the reason for non-receipt of the response, as no such temporary poor reverse-link quality was determined to have occurred.

On the other hand, if the poor-link-quality determination is in the affirmative, the RAN at step 308 excuses non-receipt of the response, since the failure to receive the response may well have resulted from a temporary problem on the reverse link. Thus, as mentioned above, it may be beneficial to not let that temporary problem prevent continued setup of the requested connection. For example, in the case of reverse-link quality 500 shown in FIG. 5a, RAN 104 would excuse the non-receipt of the response. Excusing the non-receipt of the response may involve continuing the connection-setup process, which may involve retransmitting the connection-setup message to the access terminal. In another example, however, continuing the connection-setup process may involve transmitting a different connection-setup message to the access terminal. And certainly other examples are possible.

In an example, prior to RAN 104 transmitting the connection-setup message to the access terminal, RAN 104 receives a prior connection-setup message from the access terminal via the reverse link. For instance, the prior connection-setup message may contain various setup information such as pilot information and/or data-rate-control (DRC) information. This receipt of a prior connection-setup message may indicate that access terminal 102 was previously able to communicate with RAN 104 over the reverse link, and thus may indicate that the reverse link did not suffer from poor quality at that prior stage of the connection-setup process.

Figure 6:
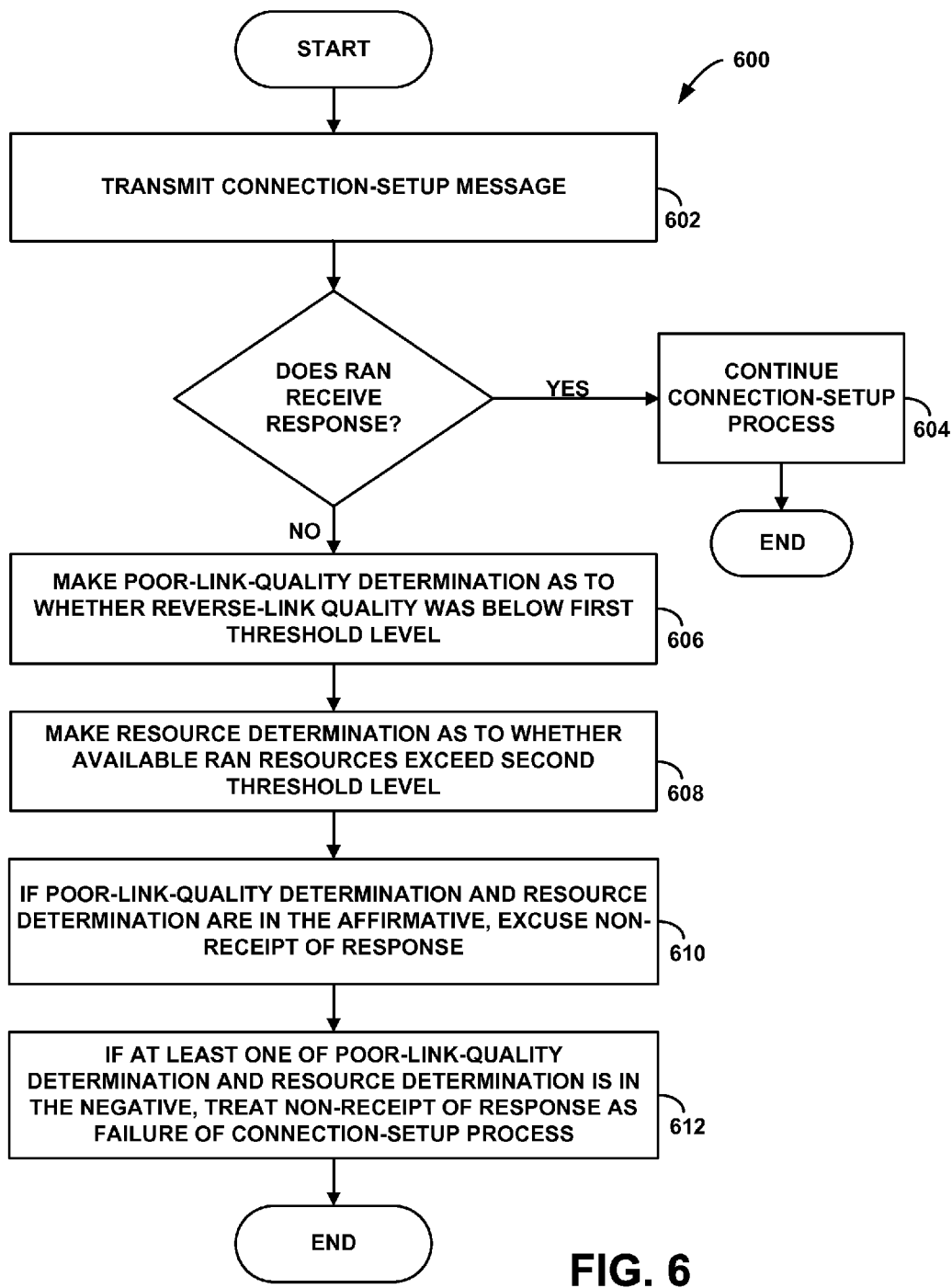
FIG. 6 is a flow chart of another method that can be carried out in accordance with an embodiment.

FIG. 6 is a flow chart of a second example method. Method 600 may be carried out by RAN 104; furthermore, method 600 is similar in some respects to method 300, and thus is not described in as great of detail. It should be explicitly noted, however, that any possibilities and permutations described above with respect to method 300 may equally apply to method 600, and vice versa.

As shown in FIG. 6, method 600 begins at step 602, where RAN 104 transmits a connection-setup message to the access terminal via the forward link. RAN 104 may then either receive or not receive, within a predetermined amount of time after transmitting the connection-setup message, a response from the access terminal. If RAN 104 has, within the predetermined amount of time after transmitting the connection-setup message, received a response, RAN 104 at step 604 continues the connection-setup process. However, if RAN 104 has not, within the predetermined amount of time after transmitting the connection-setup message, received a response, RAN 104 at step 606 makes a poor-link-quality determination as to whether a quality of the reverse link was below a first threshold level for an evaluation period consisting of at least part of the time that has elapsed since transmitting the connection-setup message.

Next, RAN 104 at step 608 makes a resource determination as to whether available RAN resources exceed a second threshold level. If both the poor-link-quality determination and the resource determination are in the affirmative (i.e., (i) the quality of the reverse link was below the threshold level for the evaluation period and (ii) the available RAN resources exceed the second threshold level), RAN 104 at step 610 then excuses non-receipt of the response at least in part by continuing the connection-setup process. On the other hand, if it is the case that at least one of the poor-link-quality determination and the resource determination is in the negative (i.e., (i) the quality of the reverse link was not below the threshold level for the evaluation period and/or (ii) the available RAN resources do not exceed the second threshold level), RAN 104 at step 612 then treats non-receipt of the response as a failure of the connection-setup process at least in part by terminating the connection-setup process.

With method 300, there may be a risk that RAN 104 will end up assigning a traffic channel to the access terminal without the access terminal successfully receiving and using the assigned traffic channel. Beneficially, method 600 involves RAN 104 identifying a sufficient amount of available RAN resources to justify excusing the non-receipt of the response and potentially assigning a traffic channel to the access terminal in a situation where the access terminal may well not successfully receive and use the assigned traffic channel, thereby not giving preferential treatment to that access terminal (which may not even use the assigned traffic channel) over other access terminals attempting to connect or communicate with RAN 104.

In an example, the second threshold level of available RAN resources may be a given number of available channel elements; in that example, RAN 104 would not continue the connection-setup process unless there are a sufficient number of channel elements available, for example, to account for new access terminals that may attempt to connect with the RAN. For instance, the second threshold level of available RAN resources may be 10 or more channel elements. As another example, the threshold level of available RAN resources may be a given number of media access control (MAC) IDs. Other example threshold levels of available RAN resources are possible as well.

5. Conclusion

Various embodiments have been described above. Those skilled in the art will understand, however, that changes and modifications may be made to those examples without departing from the scope of the claims.

I claim:

1. A method of managing a connection-setup process between a radio access network (RAN) and an access terminal, the method comprising:
   the RAN transmitting a connection-setup message to the access terminal;
   if the RAN has, within a predetermined amount of time after transmitting the connection-setup message, received from the access terminal via a reverse link a response to the connection-setup message, the RAN continuing the connection-setup process; and
   if the RAN has not, within the predetermined amount of time after transmitting the connection-setup message, received from the access terminal via the reverse link the response to the connection-setup message, the RAN:
      (i) making a poor-link-quality determination as to whether a quality of the reverse link was below a threshold level for an evaluation period consisting of at least part of a time that has elapsed since transmitting the connection-setup message,
      (ii) if the poor-link-quality determination is in a negative, treating a non-receipt of the response as a failure of the connection-setup process, wherein treating the non-receipt of the response as the failure of the connection-setup process comprises terminating the connection-setup process, and
      (iii) if the poor-link-quality determination is in an affirmative, excusing the non-receipt of the response, wherein excusing the non-receipt of the response comprises continuing the connection-setup process.

2. The method of claim 1, wherein the connection-setup message is a reverse-traffic-acknowledgement message.

3. The method of claim 2, wherein the response is a traffic-channel-complete message.

4. The method of claim 1, wherein making the poor-link-quality determination comprises:
   monitoring the quality of the reverse link to determine a reverse-link-quality history; and
   comparing the reverse-link-quality history to the threshold level to determine whether the quality of the reverse link was below the threshold level.

5. The method of claim 4, wherein monitoring the quality of the reverse link comprises monitoring a reverse-noise-rise (RNR) level of the reverse link.

6. The method of claim 5, wherein the threshold level corresponds to a given RNR level.

7. The method of claim 6, wherein the given RNR level is at least 7 decibels.

8. The method of claim 1, wherein continuing the connection-setup process comprises retransmitting the connection-setup message to the access terminal.

9. The method of claim 1, wherein continuing the connection-setup process comprises transmitting a second connection-setup message to the access terminal, wherein the second connection-setup message is different than the connection-setup message.

10. The method of claim 1, wherein continuing the connection-setup process comprises treating the connection-setup process as successfully concluded, the method further comprising:
    the RAN exchanging call data with the access terminal.

11. The method of claim 1, further comprising:
    prior to transmitting the connection-setup message to the access terminal, the RAN receiving a prior connection-setup message from the access terminal.

12. The method of claim 11, wherein the prior connection-setup message contains at least one of pilot information and data-rate-control information.

13. The method of claim 1, wherein the predetermined amount of time is at least five seconds.

14. A method of managing a connection-setup process between a radio access network (RAN) and an access terminal, the method comprising:
    the RAN transmitting a connection-setup message to the access terminal;
    if the RAN has, within a predetermined amount of time after transmitting the connection-setup message, received from the access terminal via a reverse link a response to the connection-setup message, the RAN continuing the connection-setup process; and
    if the RAN has not, within the predetermined amount of time after transmitting the connection-setup message, received from the access terminal via the reverse link the response to the connection-setup message, the RAN:
       (i) making a poor-link-quality determination as to whether a quality of the reverse link was below a first threshold level for an evaluation period consisting of at least part of a time that has elapsed since transmitting the connection-setup message,
       (ii) making a resource determination as to whether available RAN resources exceed a second threshold level,
       (iii) if both the poor-link-quality determination and the resource determination are in an affirmative, excusing a non-receipt of the response, wherein excusing the non-receipt of the response comprises continuing the connection-setup process, and
       (iv) if at least one of the poor-link-quality determination and the resource determination is in a negative, treating the non-receipt of the response as a failure of the connection-setup process, wherein treating the non-receipt of the response as the failure of the connection-setup process comprises terminating the connection-setup process.

15. The method of claim 14, wherein the second threshold level is a given number of available channel elements.

16. The method of claim 14, wherein making the poor-link-quality determination comprises:
    monitoring the quality of the reverse link to determine a reverse-link-quality history; and
    comparing the reverse-link-quality history to the first threshold level to determine whether the quality of the reverse link was below the first threshold level.

17. The method of claim 16, wherein monitoring the quality of the reverse link comprises monitoring a reverse-noise-rise (RNR) level of the reverse link.

18. The method of claim 17, wherein the first threshold level corresponds to a given RNR level.

19. The method of claim 14, wherein continuing the connection-setup process comprises retransmitting the connection-setup message to the access terminal.

20. A radio access network (RAN) comprising:
- an antenna that radiates to define at least one wireless-coverage area, the at least one wireless-coverage area serving an access terminal;
- a memory that stores (i) a threshold reverse-link-quality level and (ii) program instructions; and
- a processor capable of executing the program instructions to:
  - (i) transmit a connection-setup message to the access terminal;
  - (ii) if the RAN has, within a predetermined amount of time after transmitting the connection-setup message, received a response to the connection-setup message from the access terminal via a reverse link, continue the connection-setup process
  - (iii) if the RAN has not, within the predetermined amount of time after transmitting the connection-setup message, received the response to the connection-setup message from the access terminal via the reverse link, then the RAN:
    - (a) making a poor-link-quality determination as to whether a quality of the reverse link was below a threshold level for an evaluation period consisting of at least part of a time that has elapsed since transmission of the connection-setup message,
    - (b) if the poor-link-quality determination is in a negative, treating a non-receipt of the response as a failure of the connection-setup process at least in part by terminating the connection-setup process, and
    - (c) if the poor-link-quality determination is in an affirmative, excusing the non-receipt of the response at least in part by continuing the connection-setup process.

\* \* \* \* \*